Aug. 7, 1945.　　　　　G. SIRECI　　　　　2,381,698
PLUMB BOB
Filed Sept. 1, 1944
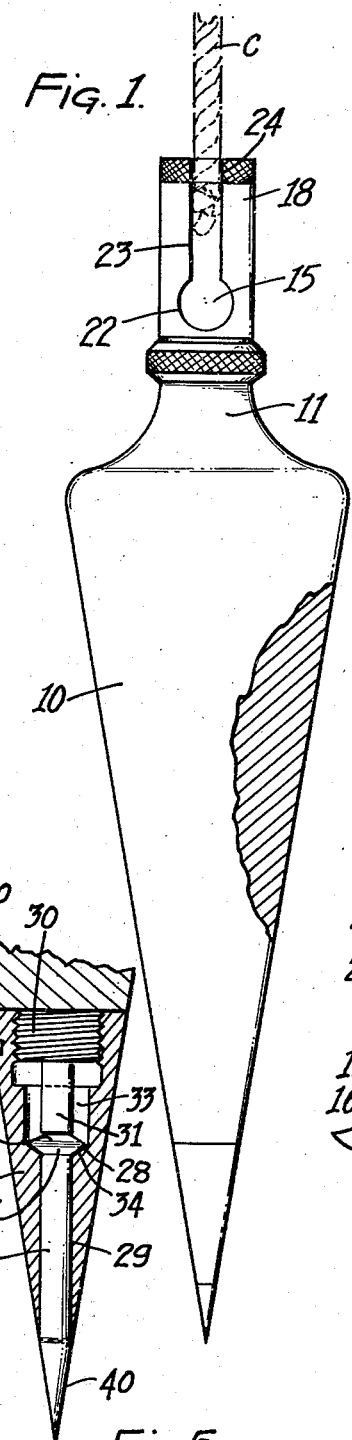
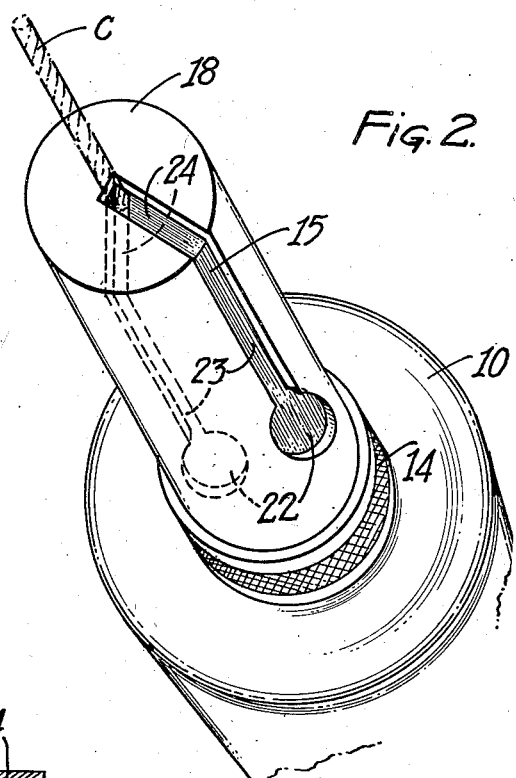
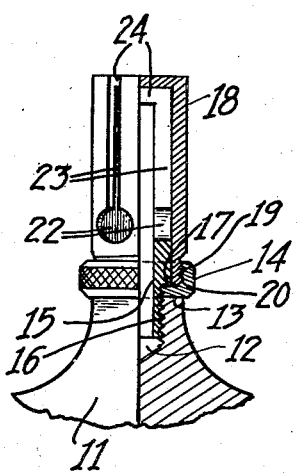
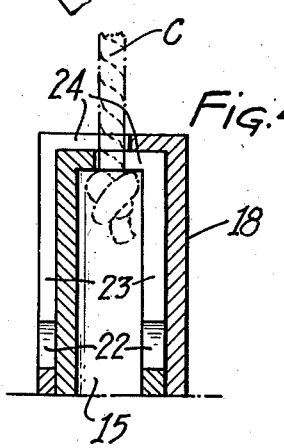
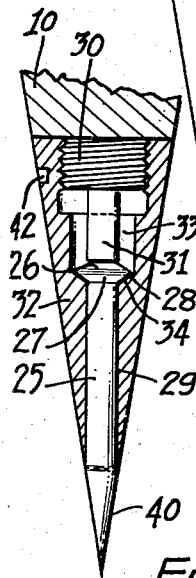
INVENTOR:
GESUALDO SIRECI
BY
*John J. Lynch*
ATTY.

Patented Aug. 7, 1945

2,381,698

UNITED STATES PATENT OFFICE 2,381,698

PLUMB BOB

Gesualdo Sireci, Brooklyn, N. Y.

Application September 1, 1944, Serial No. 552,249

3 Claims. (Cl. 33—216)

This invention relates to plumb bobs and in particular to a type that provides perfect balance and accurately points to the position denoting the true vertical position of the line by which the plumb bob is suspended.

A particular object of the invention is to provide a plumb bob having a novel top or crown portion and a pointed end part which contribute to the accurate use of the plumb bob in practical work. In carrying out the objects of my invention, I provide a removable cap or crown in the nature of relatively revolvable sleeves which admit the knotted end of the suspension cord and are thereafter adjusted to imprison the end of the cord without gripping the same so that the plumb bob can center itself with respect to the knot of the cord, which is not the case in plumb bobs where the cord is gripped and held by an eye in which the end of the cord is tied. A still further object is to provide means whereby the cord can be quickly attached to the bob and removed therefrom without such manipulation of the parts as would waste time or require a special knowledge.

Further objects of the invention are to provide a removable tip for the bob which is self-seating, which is of highly tempered steel and will accurately indicate the plumb point and one which can be easily replaced so that at all times the bob may be provided with an accurate point and one which is so tapered that its taper conforms to the outline of the bob so that dirt is not collected between and within the parts which might tend to unbalance the plumb bob. This is true of the cap members which are movable to close the top of the bob to dust and dirt that might accumulate therein with detrimental results to the accuracy of the bob.

A still further object is to make a plumb bob which can be assembled readily, which can be made at low cost in comparison to its accuracy and one which can be made ready for use quickly.

With these and other objects in view, the invention comprises certain constructions hereinafter described and then particularly pointed out in the claims and a preferred embodiment of my invention is illustrated in the accompanying drawing, in which:

Figure 1 is a view, partly in section, of a plumb bob constructed in accordance with my invention, Figure 2 is a view in perspective of the upper end of the bob showing the relative positions of the crown caps that imprison the cord, Figure 3 is a view in section of the upper end of the bob showing the external and internal construction thereof, Figure 4 is an enlarged cross section taken through the upper crown caps showing the relation of the slots in the caps when the latter are in string imprisoning relation, and Figure 5 is an enlarged view in section taken through the lower end of the plumb bob and showing the construction thereof.

Referring to the drawing in detail, 10 indicates the tapered body of the plumb bob, which is made of metal and presents a neck portion 11 at the upper end thereof which is provided with a threaded bore 12 and a seat 13 upon which rests a retaining ring 14. The latter has a central opening through which the inner cap 15 is threaded into the bore 12 through the medium of its threaded end 16 presenting a shoulder 17 that rests inside the ring 14 within the lower end of the outer cap 18. The lower end of the outer cap is threaded as at 19 and arranged to be screwed into the interiorly threaded portion 20 of the ring 14. Both the caps 15 and 18 are provided with matching holes 22 in the vertical wall thereof and with slots 23 which extend vertically from said holes 22 to the tops of each cap and thereacross to the centers thereof, presenting horizontally disposed portions 24. The meeting portions of said horizontally disposed portions provide an opening through which the cord may extend as indicated in outline in the various figures.

The knotted cord C, shown in outline, is placed within the inner cap 15 and then the outer cap 18 is revolved until its slotted opening is out of register with the slotted opening of the inner cap and the cord is thus imprisoned inside the inner cap. The outer cap when rotated to imprison the cord, is threaded into the ring 14 and jammed to locking position, so that the cord may not accidentally pull or find its way out of the upper end of the plumb bob.

The lower end of the body 10 is provided with a concentric threaded projection 30 and an axially aligned pin holding stud 31. To the threaded projection a pin carrier 32 is screwed so that the stud 31 projects into a pin recess 33 in said carrier 32 and holds a pin firmly on a pin seat 34 in the recess 33. The pin 25 is of tempered or hardened steel and is provided with a head 26, whose under side is bevelled as at 27 to coact with a bevel 28 of like shape in the pin seat 34 so that when the pin is dropped into the carrier 32 it will seat itself properly in the carrier and extend through the bore 29 thereof and provide a depending point end for the plumb bob. The lower end of the pin is tapered as at 40 to correspond to the taper of the carrier 32, which in turn is exteriorly tapered to correspond to the taper of the body 10, thus providing a plumb bob having an unbroken tapered contour from the upper part of its body to the lower tip end, which prevents accumulation of dirt and renders it easy to keep the plumb bob clean and smooth, and through the medium of a wrench socket 42 in the carrier, the latter can be easily detached from the body 10 for insertion or replacement of a pin 25.

It is evident therefore, that I have provided an improved plumb bob construction which will permit of replacement of a pin of hardened metal as a tip for the bob which insures accuracy in the use of the plumb bob and also means for easily and quickly attaching and detaching a string or cord thereto which can be completely removed from the plumb bob and be stored or carried therewith and which a worker will find it expedient to attach to the plumb bob for use of the latter.

My invention is not to be restricted to the precise details of construction shown since various changes and modifications may be made therein without departing from the scope of the invention or sacrificing the advantages derived from its use.

What I claim is:

1. In a plumb bob, in combination, a tapered solid body, a threaded stub formed on an end of said body, a pin holding stud extending from said stub, the stub and stud being formed integrally with said body, a pin carrier having a threaded recess in one end and an axial bore extending from said recess and presenting a bevelled pin seat, said carrier being arranged for threaded attachment to the body through connection of said threaded stub and threaded recess, a pin having a bevelled head portion for seating on said bevelled pin seat and the pin extending through said bore and projecting from the free end of said carrier to present a tip for said plumb bob and said stud being arranged to engage and hold the pin securely on said seat when the carrier is threaded into position on said stub.

2. In a plumb bob, in combination, a tapered solid body, a threaded stub formed on an end of said body, a pin holding stud extending from said stub, the stub and stud being formed integrally with said body, a pin carrier having a threaded recess in one end and an axial bore presenting a pin seat, said carrier being arranged for removable attachment to the body through connection of said threaded stub and threaded recess, a headed pin seating on said pin seat, passing through said bore and extending beyond the end of said carrier to present a tip for the plumb bob, and said stud being arranged to engage and hold the pin securely on said seat when the carrier is threaded into position on said stub.

3. In a plumb bob, in combination, of the character set forth in claim 2 in which the pin carrier and the extending portion of the pin are tapered to match the taper of the solid body to present an unbroken surface from the body to the tip of the plumb bob.

GESUALDO SIRECI.